(12) United States Patent
Chen et al.

(10) Patent No.: US 9,456,358 B2
(45) Date of Patent: Sep. 27, 2016

(54) METHOD AND APPARATUS FOR INDICATING ACTIVE CHANNEL STATE INFORMATION REFERENCE SIGNAL (CSI-RS) CONFIGURATIONS

(71) Applicant: QUALCOMM Incorporated, San Diego, CA (US)

(72) Inventors: Wanshi Chen, San Diego, CA (US); Aleksandar Damnjanovic, Del Mar, CA (US); Peter Gaal, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 13/831,098

(22) Filed: Mar. 14, 2013

(65) Prior Publication Data

US 2014/0044040 A1    Feb. 13, 2014

Related U.S. Application Data

(60) Provisional application No. 61/682,594, filed on Aug. 13, 2012.

(51) Int. Cl.
*H04W 4/00* (2009.01)
*H04W 24/02* (2009.01)
(Continued)

(52) U.S. Cl.
CPC .............. *H04W 24/02* (2013.01); *H04L 5/005* (2013.01); *H04L 5/0094* (2013.01); *H04L 5/001* (2013.01);
(Continued)

(58) Field of Classification Search
CPC .... H04W 24/02; H04W 24/00; H04J 3/1694
USPC .......................................................... 370/328
See application file for complete search history.

(56) References Cited

U.S. PATENT DOCUMENTS

2010/0150090 A1* 6/2010 Park ...................... H04L 1/0023
                                                              370/329
2011/0317657 A1   12/2011 Chmiel et al.
(Continued)

FOREIGN PATENT DOCUMENTS

EP           2603031 A1    6/2013
KR    WO 2011115421 A2 *  9/2011  ........... H04L 5/0048
(Continued)

OTHER PUBLICATIONS

3GPP TS136.211.v10.1.0.*
(Continued)

*Primary Examiner* — Andrew Chriss
*Assistant Examiner* — Voster Preval
(74) *Attorney, Agent, or Firm* — Harrity & Harrity, LLP

(57) ABSTRACT

Techniques for indicating active channel state information reference signal (CSI-RS) configurations for a user equipment (UE) are disclosed. The UE may be configured with multiple CSI-RS configurations and may receive signaling indicating which of its CSI-RS configurations are active. Improved performance may be obtained by dynamically signaling the active CSI-RS configurations. In one example, the UE may receive first signaling (e.g., upper-layer signaling) indicating a plurality of CSI-RS configurations configured for the UE. The UE may receive second signaling (e.g., lower-layer signaling) indicating at least one active CSI-RS configuration for the UE. The active CSI-RS configuration(s) may include all or a subset of the plurality of CSI-RS configurations. The UE may perform at least one communication task based on the at least one active CSI-RS configuration for the UE. The communication task(s) may include de-rate matching, CSI reporting, cell set management, etc.

55 Claims, 8 Drawing Sheets

(51) Int. Cl.
*H04L 5/00* (2006.01)
*H04L 5/14* (2006.01)
*H04W 28/22* (2009.01)

(52) U.S. Cl.
CPC ............ *H04L 5/0023* (2013.01); *H04L 5/0035* (2013.01); *H04L 5/0053* (2013.01); *H04L 5/0073* (2013.01); *H04L 5/1469* (2013.01); *H04W 28/22* (2013.01)

(56) References Cited

U.S. PATENT DOCUMENTS

| | | | |
|---|---|---|---|
| 2012/0176939 A1 | 7/2012 | Qu et al. | |
| 2012/0257554 A1* | 10/2012 | Kim | H04L 5/001 370/280 |
| 2013/0223295 A1* | 8/2013 | Choi | H04W 72/0406 370/280 |
| 2013/0322333 A1* | 12/2013 | Tsai | H04W 4/00 370/328 |
| 2014/0010126 A1* | 1/2014 | Sayana | H04J 3/1694 370/280 |
| 2014/0219115 A1* | 8/2014 | Etemad | H04W 28/12 370/252 |

FOREIGN PATENT DOCUMENTS

| | | |
|---|---|---|
| WO | 2011115421 A2 | 9/2011 |
| WO | WO 2011115421 A2 * | 9/2011 |
| WO | 2012020963 A2 | 2/2012 |
| WO | 2012094608 A2 | 7/2012 |
| WO | 2012108807 A1 | 8/2012 |
| WO | 2012124552 A1 | 9/2012 |

OTHER PUBLICATIONS

International Search Report and Written Opinion—PCT/US2013/054439—ISA/EPO—Mar. 6, 2014.
NTT Docomo et al., "Higher layer signaling of CSI-RS and muting configurations", 3GPP Draft; R2-110607 CSI-RS Signaling, 3rd Generation Partnership Project (3GPP), Mobile Competence Centre; 650, Route Des Lucioles; F-06921 Sophia-Antipolis Cedex; France, vol. RAN WG2, no. Dublin, Ireland; Jan. 17, 2011, Jan. 25, 2011, pp. 1-3, XP050493168, section III figure 1.

* cited by examiner

METHOD AND APPARATUS FOR INDICATING ACTIVE CHANNEL STATE INFORMATION REFERENCE SIGNAL (CSI-RS) CONFIGURATIONS

The present application claims priority to provisional U.S. Application Ser. No. 61/682,594, entitled "METHOD AND APPARATUS FOR INDICATING ACTIVE CHANNEL STATE INFORMATION REFERENCE SIGNAL," filed Aug. 13, 2012, and incorporated herein by reference in its entirety.

BACKGROUND

I. Field

The present disclosure relates generally to communication, and more specifically to techniques for supporting communication in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

SUMMARY

Techniques for indicating active channel state information reference signal (CSI-RS) configurations for a UE are disclosed herein. The UE may be configured with multiple CSI-RS configurations and may receive signaling indicating which of its CSI-RS configurations are active. Improved performance may be obtained by dynamically signaling the active CSI-RS configurations (instead of always assuming that all configured CSI-RS configurations are active) for de-rate matching and other communication tasks.

In one aspect, a UE may receive first signaling (e.g., upper-layer signaling) indicating a plurality of CSI-RS configurations configured for the UE. The UE may receive second signaling (e.g., lower-layer signaling) indicating at least one active CSI-RS configuration for the UE. The at least one active CSI-RS configuration may include all or a subset of the plurality of CSI-RS configurations. The second signaling may relate to an individual CSI-RS configuration, or a set of CSI-RS configurations, or a group of CSI-RS configurations. The UE may perform at least one communication task based on the at least one active CSI-RS configuration for the UE. The communication task(s) may include de-rate matching, CSI reporting, cell set management, etc.

Various aspects and features of the disclosure are described in further detail below.

DETAILED DESCRIPTION

The techniques described herein may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 includes IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA, E-UTRA, and GSM are part of Universal Mobile Telecommunication System (UMTS). 3GPP Long Term Evolution (LTE) and LTE-Advanced (LTE-A), in both frequency division duplexing (FDD) and time division duplexing (TDD), are recent releases of UMTS that use E-UTRA, which employs OFDMA on the downlink and SC-FDMA on the uplink. UTRA, E-UTRA, GSM, UMTS, LTE and LTE-A are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
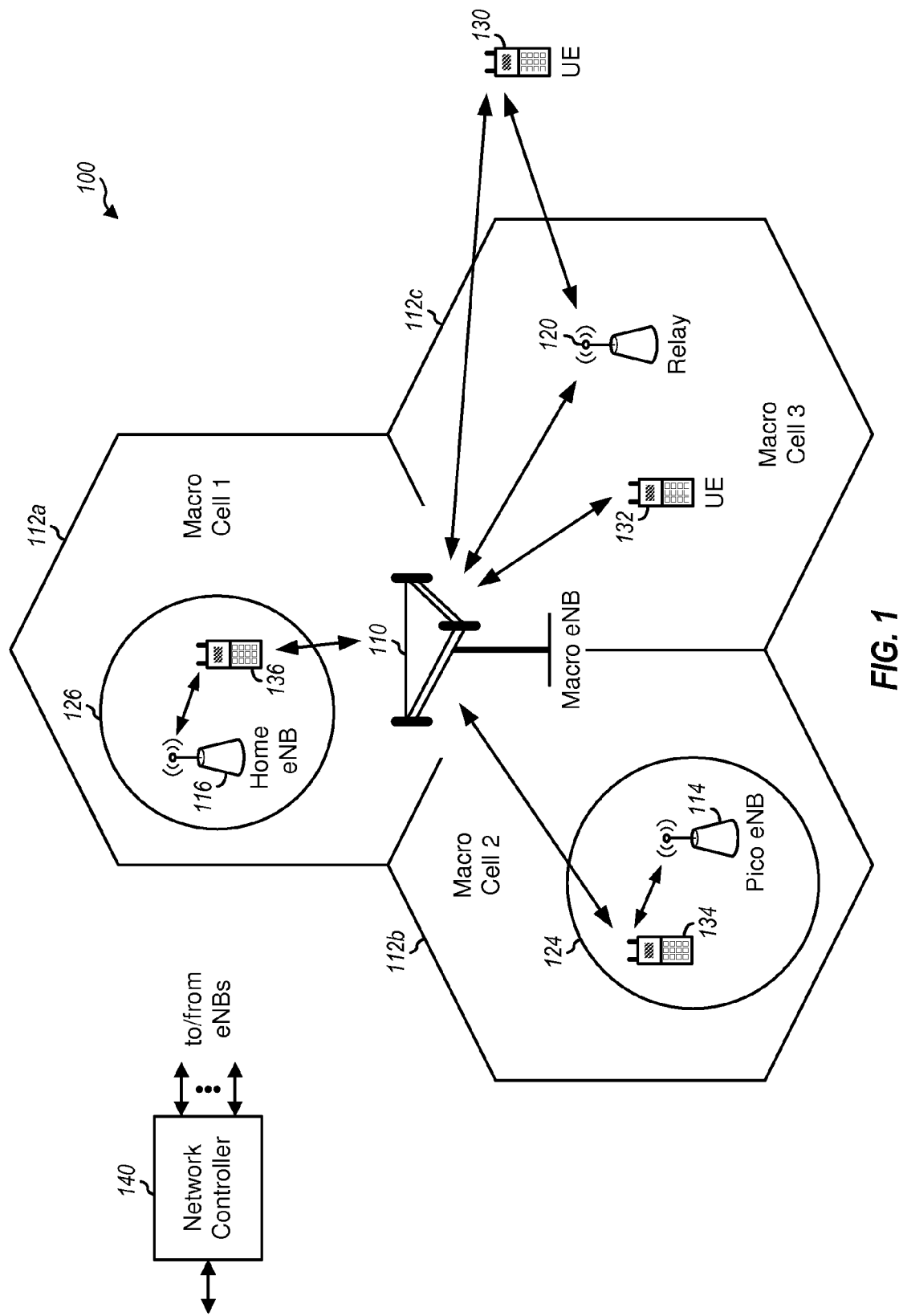
FIG. 1 shows a wireless communication network.

FIG. 1 shows a wireless communication network 100, which may be an LTE network or some other wireless network. Wireless network 100 may include a number of evolved Node Bs (eNBs) and other network entities. An eNB may be an entity that can communicate with UEs and relays and may also be referred to as a Node B, a base station, an access point, etc. An eNB may provide communication coverage for a particular geographic area and may support communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to a coverage area of an eNB and/or an eNB subsystem serving this coverage area. An eNB may support one or multiple (e.g., three) cells.

An eNB may provide communication coverage for a macro cell, a pico cell, a femto cell, and/or a cell of some other type. A macro cell may cover a relatively large geographic area (e.g., several kilometers in radius) and allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, wireless network 100 includes a macro eNB 110 for three macro cells 112a, 112b and 112c, a pico eNB 114 for a pico cell 124, and a home eNB (HeNB) 116 for a femto cell 126. A network controller 140 may couple to a set of eNBs and may provide coordination and control for these eNBs.

Wireless network 100 may also include relays. A relay may be an entity that can receive a transmission of data and/or other information from an upstream station (e.g., an eNB or a UE) and send a transmission of the data and/or other information to a downstream station (e.g., a UE or an eNB). A relay may also be a UE that can relay transmissions for other UEs. In FIG. 1, a relay 120 may communicate with eNB 110 and UE 130 in order to facilitate communication between eNB 110 and UE 130.

UEs 130 to 136 may be dispersed throughout the wireless network, and each UE may be stationary or mobile. A UE may also be referred to as a mobile station, a terminal, an access terminal, a subscriber unit, a station, etc. A UE may be a cellular phone, a smartphone, a tablet, a wireless communication device, a personal digital assistant (PDA), a wireless modem, a handheld device, a laptop computer, a cordless phone, a wireless local loop (WLL) station, a netbook, a smartbook, etc. A UE may be able to communicate with eNBs, relays, other UEs, etc.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on a carrier bandwidth. For example, the subcarrier spacing may be 15 kilohertz (KHz), and $N_{FFT}$ may be equal to 128, 256, 512, 1024 or 2048 for a carrier bandwidth of 1.4, 3, 5, 10 or 20 megahertz (MHz), respectively.

Wireless network 100 may utilize frequency division duplexing (FDD) and/or time division duplexing (TDD). For FDD, the downlink and uplink may be allocated separate frequencies. Downlink transmissions may be sent on one frequency, and uplink transmissions may be sent on another frequency. For TDD, the downlink and uplink may share the same frequency, and downlink transmissions and uplink transmissions may be sent on the same frequency in different time periods.

Figure 2:
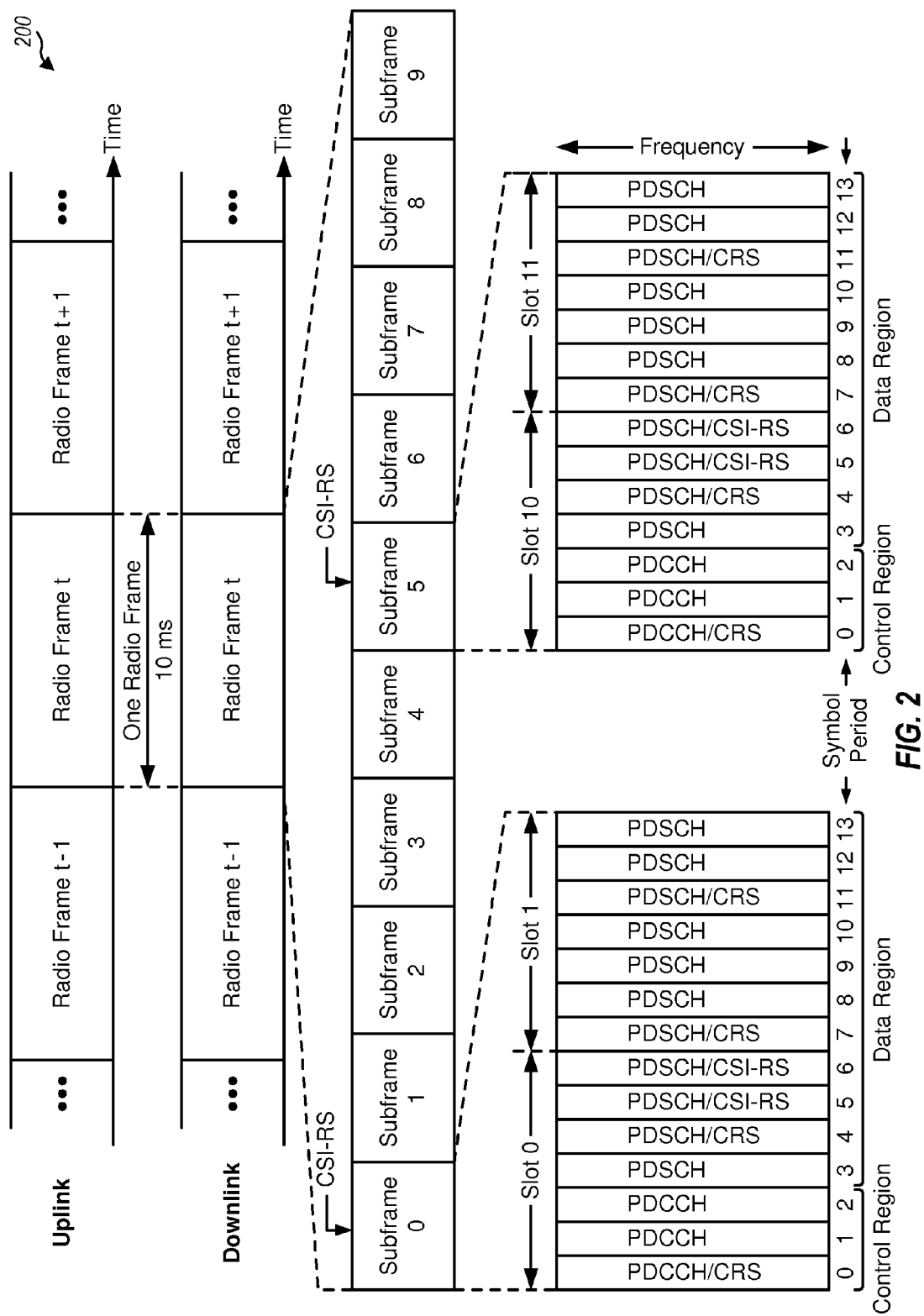
FIG. 2 shows an exemplary frame structure.

FIG. 2 shows an exemplary frame structure 200 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 to 9. Each subframe may include two slots. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 to 2L-1.

The available time frequency resources for each of the downlink and uplink may be partitioned into resource blocks (RBs). The number of RBs may be dependent on carrier bandwidth and may range from 6 to 110 RBs for carrier bandwidth of 1.4 to 20 MHz, respectively. Each RB may cover 12 subcarriers in one slot and may include a number of resource elements. Each resource element may cover one subcarrier in one symbol period and may be used to send one modulation symbol, which may be a real or complex value.

A subframe for the downlink may be referred to as a downlink subframe, and a subframe for the uplink may be referred to as an uplink subframe. As shown in FIG. 2, a downlink subframe may include a control region and a data region, which may be time division multiplexed (TDM). The control region may include the first Q symbol periods of the downlink subframe, where Q may be equal to 1, 2, 3 or 4. Q may change from subframe to subframe and may be conveyed in the first symbol period of the downlink subframe. The data region may include the remaining symbol periods of the downlink subframe.

A cell may transmit a cell-specific reference signal (CRS) in certain symbol periods of each downlink subframe. A reference signal is a signal that is known a priori by a transmitter and a receiver and may also be referred to as pilot. A CRS is a reference signal that is specific for a cell, e.g., generated based on a cell identity (ID). The CRS may be used for various purposes such as coherent demodulation, time and/or frequency synchronization, etc.

A cell may transmit a Physical Downlink Control Channel (PDCCH) and/or other physical channels in the control region of a downlink subframe. The PDCCH may carry downlink control information (DCI) such as downlink grants, uplink grants, transmit power control (TPC) information, etc. The cell may also transmit a Physical Downlink Shared Channel (PDSCH), an enhanced PDCCH (ePDCCH), and/or other physical channels in the data region of a downlink subframe. The PDSCH may carry data for UEs scheduled for data transmission on the downlink and/or other information. The ePDCCH may carry DCI and/or other information.

Figure 3:
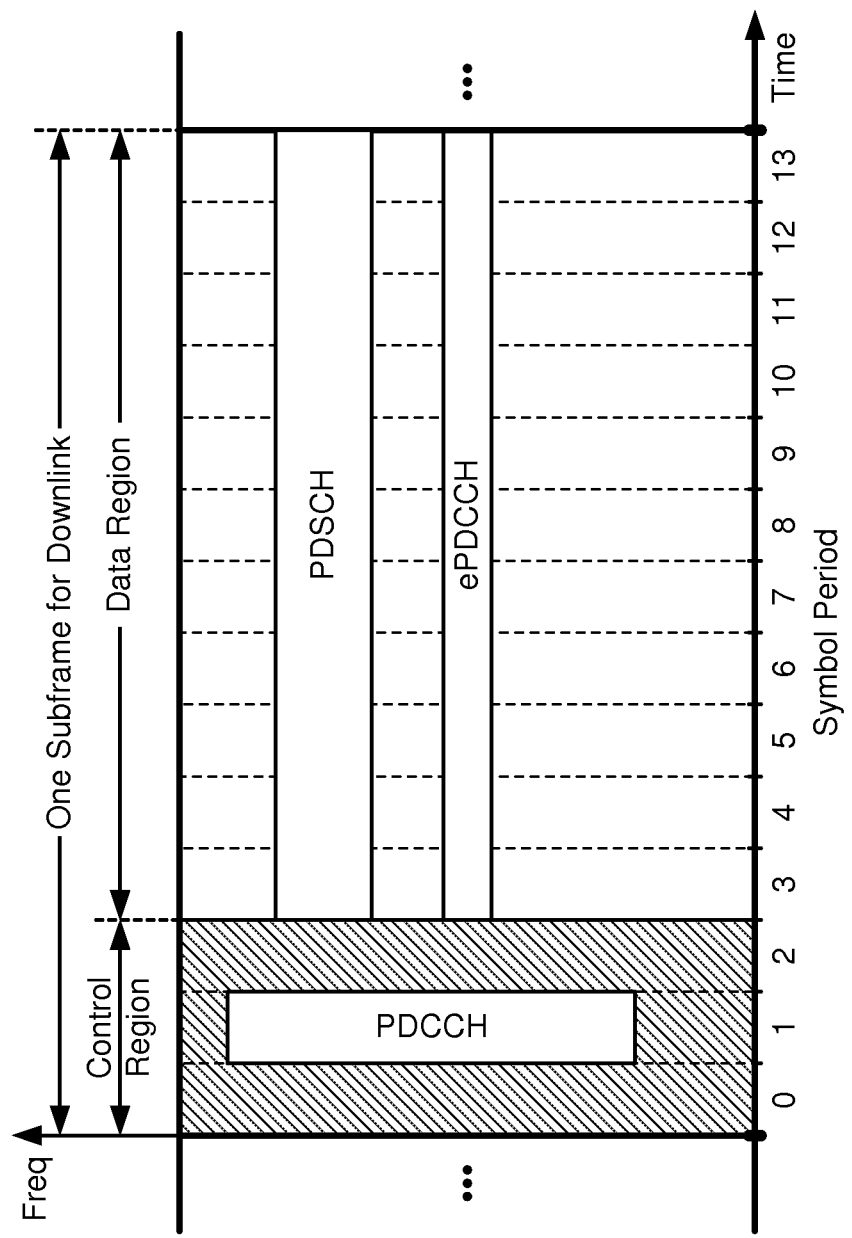
FIG. 3 shows exemplary transmission of physical channels.

FIG. 3 shows an exemplary transmission of the PDCCH, ePDCCH, and PDSCH in a downlink subframe by a cell. The PDCCH and PDSCH are supported in LTE Release 8 and later, and the ePDCCH may be supported in LTE Release 11 and/or later. The cell may transmit one or more instances of the PDCCH in the control region of a downlink subframe. Each instance of the PDCCH may be transmitted in one or more Control Channel Elements (CCEs), with each CCE including 36 resource elements. Each instance of the PDCCH may be transmitted across an entire carrier bandwidth.

The cell may transmit the ePDCCH in the data region of a downlink subframe, similar to the PDSCH. The ePDCCH may be used for various purposes such as to increase control channel capacity, to support frequency-domain inter-cell interference coordination (ICIC), to improve spatial reuse of control channel resource, to support beamforming and/or diversity, to support operation on a carrier that does not carry control information, to support operation in broadcast/MBSFN subframes, to support coexistence on a carrier supporting legacy UEs operating based on LTE Release 8, etc.

The various channels in LTE are described in 3GPP TS 36.211, entitled "Evolved Universal Terrestrial Radio Access (E-UTRA); Physical Channels and Modulation," which is publicly available.

Wireless network 100 may support operation on multiple carriers, which may be referred to as carrier aggregation or multi-carrier operation. A carrier may refer to a range of frequencies used for communication and may be associated with certain characteristics. For example, a carrier may be associated with system information and/or control information describing operation on the carrier. A carrier may also be referred to as a component carrier (CC), a frequency channel, a cell, etc. A UE may be configured with multiple carriers for the downlink and one or more carriers for the uplink for carrier aggregation. A cell may transmit data and DCI on one or more carriers to the UE. The UE may transmit data and uplink control information (UCI) on one or more carriers to the cell.

Wireless network 100 may support operation on "legacy" carriers. A legacy carrier may be a carrier that supports operation as defined in LTE Release 8. A legacy carrier for the downlink may support transmission of a primary synchronization signal (PSS), a secondary synchronization signal (SSS), a Physical Broadcast Channel (PBCH), the PDCCH, the PDSCH, and/or other signals and physical channels to support communication for UEs on the carrier. A legacy carrier for the uplink may support transmission of a Physical Uplink Control Channel (PUCCH), a Physical Uplink Shared Channel (PUSCH), and/or other signals and physical channels to support communication for UEs on the carrier.

Wireless network 100 may also support operation on carriers of a new carrier type (NCT) on the downlink and/or uplink. A carrier of a new carrier type may also be referred to as an NCT carrier, a new carrier, etc. An NCT carrier may not be backward compatible with a legacy carrier supporting LTE Release 8. For example, CRS may be transmitted on an NCT carrier in a subset of downlink subframes (e.g., in every 5 downlink subframes) instead of in every downlink subframe as would be the case for a legacy carrier. Furthermore, the CRS may be transmitted via only one antenna port and/or over a narrowband (instead of via multiple antenna ports and/or over the entire carrier bandwidth as might be the case for a legacy carrier). These characteristics of the CRS on an NCT carrier may reduce downlink overhead and provide energy savings for a cell.

An NCT carrier may be a standalone carrier or may be associated with a legacy carrier as part of carrier aggregation. An NCT carrier may not have the control region, e.g., in some downlink subframes or possibly all downlink subframes. An NCT carrier may rely on (i) the ePDCCH and/or other control channels sent in the data region of the NCT carrier to carry DCI and/or (ii) another carrier to carry DCI.

Referring back to FIG. 2, a cell may transmit CSI-RS in certain symbol periods of certain downlink subframes. The CSI-RS may be used for various purposes such as channel measurement, interference measurement, CSI feedback, cell set management, etc. In the example shown in FIG. 2, the CSI-RS is transmitted every 5 ms in downlink subframes 0 and 5 of each radio frame. The CSI-RS may also be transmitted with other periodicity and/or in other downlink subframes.

LTE Release 10 and later supports a number of CSI-RS configurations. Each CSI-RS configuration is associated with specific subcarriers, specific symbols, and specific slots in which CSI-RS may be transmitted. LTE Release 10 and later also supports transmission of CSI-RS from one antenna port with port index p=15, or two antenna ports with port indices p=15,16, or four antenna ports with port indices p=15, . . . , 18, eight antenna ports with port indices p=15, . . . , 22. The subcarriers and symbol periods used for transmission of CSI-RS may be given as follows:

$$k = k' + 12\, m + k_p, \text{ and} \quad \text{Eq (1)}$$

$$l = l' + l'', \quad \text{Eq (2)}$$

where k is an index of a subcarrier on which CSI-RS is transmitted, k' is a subcarrier offset, which is provided by a CSI-RS configuration, $k_p$ is an offset for an antenna port from which CSI-RS is transmitted, m is an index from 0 to $N_{RB}^{DL}-1$, where $N_{RB}^{DL}$ is the number of RBs on downlink, l is an index of a symbol period in which CSI-RS is transmitted, l' is a symbol period offset, which is provided by the CSI-RS configuration, and l'' is an index from 0 to 1 in many cases.

Each CSI-RS configuration is associated with a specific subcarrier offset k', a specific symbol period offset l', and a specific slot ($n_s$ mod 2) in which to transmit CSI-RS. Table 1 lists the values of k', l', and ($n_S$ mod 2) for different possible CSI-RS configurations for the normal cyclic prefix. CSI-RS configurations 0 to 19 are applicable for both FDD and TDD, and CSI-RS configurations 20 to 31 are only applicable for TDD. The values of k', l', and ($n_S$ mod 2) for different possible CSI-RS configurations for the normal cyclic prefix and the extended cyclic prefix are given in 3GPP 36.211, which is publicly available.

TABLE 1

| CSI-RS Configurations for Normal Cyclic Prefix | | | | | | |
|---|---|---|---|---|---|---|
| | Number of CSI Reference Signals Configured | | | | | |
| CSI-RS | 1 or 2 | | 4 | | 8 | |
| Configuration | k', l' | $n_S$ mod 2 | k', l' | $n_S$ mod 2 | k', l' | $n_S$ mod 2 |
| 0 | 9, 5 | 0 | 9, 5 | 0 | 9, 5 | 0 |
| 1 | 11, 2 | 1 | 11, 2 | 1 | 11, 2 | 1 |
| 2 | 9, 2 | 1 | 9, 2 | 1 | 9, 2 | 1 |
| 3 | 7, 2 | 1 | 7, 2 | 1 | 7, 2 | 1 |
| 4 | 9, 5 | 1 | 9, 5 | 1 | 9, 5 | 1 |
| 5 | 8, 5 | 0 | 8, 5 | 0 | | |
| 6 | 10, 2 | 1 | 10, 2 | 1 | | |
| 7 | 8, 2 | 1 | 8, 2 | 1 | | |
| 8 | 6, 2 | 1 | 6, 2 | 1 | | |
| 9 | 8, 5 | 1 | 8, 5 | 1 | | |
| 10 | 3, 5 | 0 | | | | |
| 11 | 2, 5 | 0 | | | | |
| 12 | 5, 2 | 1 | | | | |
| 13 | 4, 2 | 1 | | | | |
| 14 | 3, 2 | 1 | | | | |
| 15 | 2, 2 | 1 | | | | |
| 16 | 1, 2 | 1 | | | | |
| 17 | 0, 2 | 1 | | | | |
| 18 | 3, 5 | 1 | | | | |
| 19 | 2, 5 | 1 | | | | |
| 20 | 11, 1 | 1 | 11, 1 | 1 | 11, 1 | 1 |
| 21 | 9, 1 | 1 | 9, 1 | 1 | 9, 1 | 1 |
| 22 | 7, 1 | 1 | 7, 1 | 1 | 7, 1 | 1 |
| 23 | 10, 1 | 1 | 10, 1 | 1 | | |
| 24 | 8, 1 | 1 | 8, 1 | 1 | | |
| 25 | 6, 1 | 1 | 6, 1 | 1 | | |
| 26 | 5, 1 | 1 | | | | |
| 27 | 4, 1 | 1 | | | | |
| 28 | 3, 1 | 1 | | | | |
| 29 | 2, 1 | 1 | | | | |
| 30 | 1, 1 | 1 | | | | |
| 31 | 0, 1 | 1 | | | | |

Figure 4:
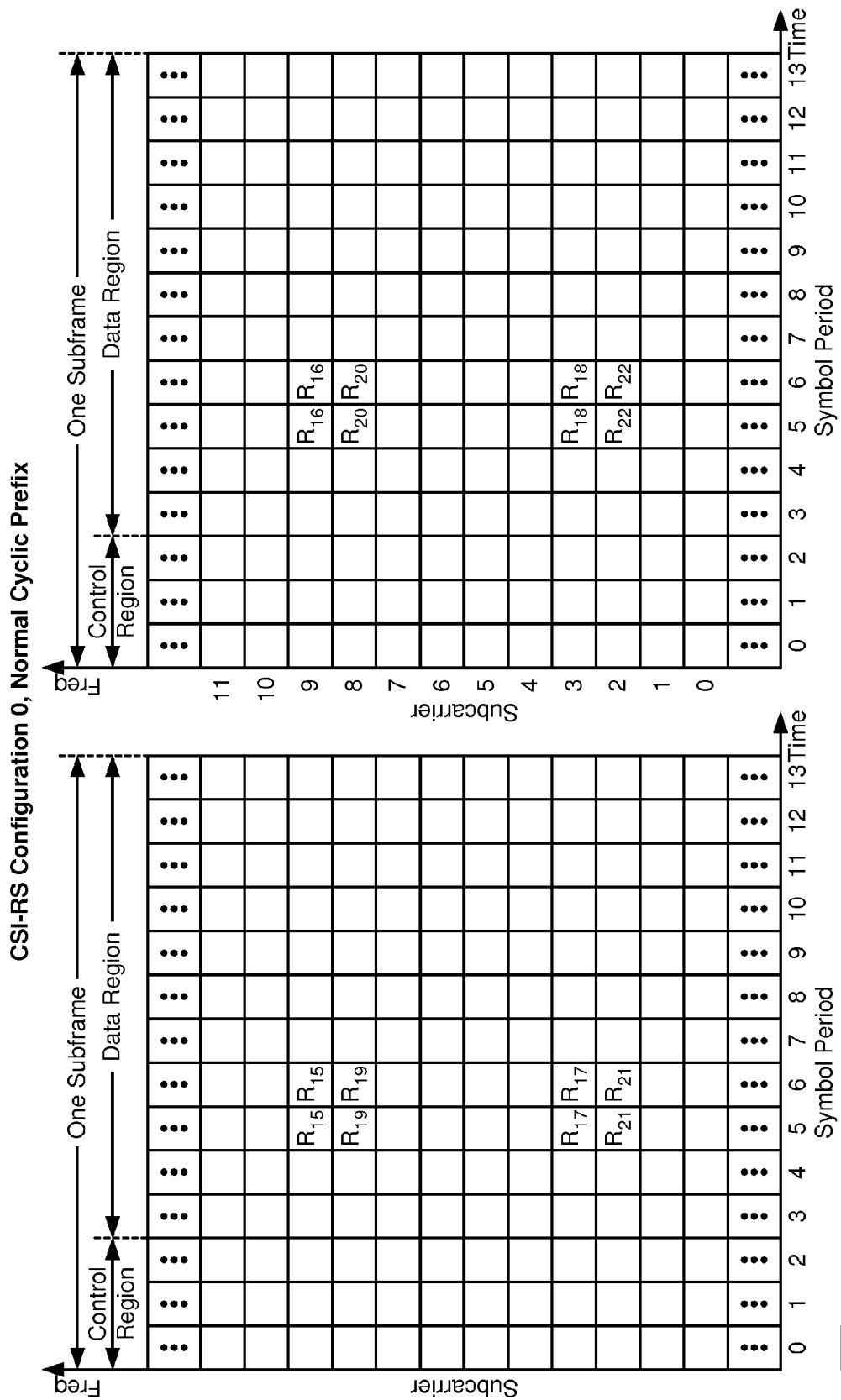
FIG. 4 shows exemplary transmission of CSI-RS.

FIG. 4 shows an exemplary transmission of CSI-RS based on CSI-RS configuration 0 for the normal cyclic prefix. For CSI-RS configuration 0, k'=9, l'=5, and ($n_S$ mod 2)=0. For the normal cyclic prefix, CSI-RS is transmitted (i) from antenna ports 15 and 16 on subcarrier 9 in symbol periods 4 and 5 of the left slot with $k_p$=0 and p∈{15,16}, (ii) from antenna ports 17 and 18 on subcarrier 3 in symbol periods 4 and 5 of the left slot with $k_p$=−6 and p∈{17,18}, (iii) from antenna ports 19 and 20 on subcarrier 8 n symbol periods 4 and 5 of the left slot with $k_p$=−1 and p∈{19, 20}, and (iv) from antenna ports 21 and 22 on subcarrier 2 in symbol periods 4 and 5 of the left slot with $k_p$=−7 and p∈{21, 22}.

A UE may be configured with one or more sets of CSI-RS configurations via upper-layer signaling such as Radio Resource Control (RRC) signaling. Different sets of CSI-RS configurations may be designated to serve different purposes, and different purposes may be associated with different communication tasks performed by the UE. The UE may be configured with one or more CSI-RS configurations for a given purpose. For example, the UE may be configured with a plurality of CSI-RS configurations for purposes such as CSI feedback, Coordinated MultiPoint (CoMP) set management, radio link management/radio resource management (RLM/RRM), etc. CSI feedback may refer to reporting of CSI from a UE to a cell. CSI may include channel quality indicator (CQI), precoding matrix indicator (PMI), rank indicator (RI), etc. CoMP set management may refer to management of a set of cells that can participate in CoMP transmission to the UE. RLM/RRM may refer to management of a set of cells that can be selected to serve the UE on the downlink and/or uplink. The UE may use different ones of its CSI-RS configurations at different times. The use of the CSI-RS configurations may change semi-statically or even dynamically according to the present disclosure.

A UE may share CSI-RS configurations with other UEs in the same cell, or may be configured with CSI-RS configurations that are compatible with CSI-RS configurations of other UEs. Furthermore, the assignment of CSI-RS configurations to the UE may reflect considerations that relate to different cells. For example, some CSI-RS configurations may take into account interference management, CoMP sets, and other multi-cell considerations while other CSI-RS configurations may primarily relate to measurements of a serving cell.

CSI-RS configurations may be associated with non-zero-power transmissions or zero-power transmissions. For example, a UE may be configured with a first set of non-zero-power CSI-RS configurations for channel measurement related to CSI feedback. The UE may also be configured with (i) a second set of zero-power CSI-RS configurations for interference measurement purposes and (ii) a third set of zero-power CSI-RS configuration to account for CSI-RS monitored by a second UE for its CSI feedback.

A UE may measure a wireless channel based on its CSI-RS configurations and may determine CSI based on the channel measurements. The UE may perform de-rate matching for physical channels (e.g., the PDSCH and ePDCCH) sent in the data region of a downlink subframe based on the non-zero-power CSI-RS configurations for the UE and the zero power CSI-RS configurations for other UEs. The UE may perform de-rate matching in a manner complementary to rate matching performed by a cell.

A cell/transmitter may perform rate matching for a physical channel (e.g., the PDSCH) based on one or more CSI-RS configurations as follows. The cell may identify (i) all resource elements allocated to the physical channel (or data resource elements) and (ii) all resource elements used for CSI-RS (or CSI-RS resource elements) that overlap the data resource elements based on the CSI-RS configuration(s). The cell may determine the number of resource elements available to transmit the physical channel by excluding data resource elements that overlap CSI-RS resource elements. The cell may process (e.g., encode and modulate) data for the physical channel such that the processed data can be sent in the available resource elements for the physical channel. For rate matching, the cell may avoid sending data for the physical channel on the data resource elements that overlap the CSI-RS resource elements. The cell may ensure that the amount of processed data to send is matched to the number of resource elements available to send the processed data.

A UE/receiver may perform the complementary de-rate matching for a physical channel (e.g., the PDSCH) based on one or more CSI-RS configurations as follows. The UE may identify (i) all resource elements allocated to the physical channel (or data resource elements) and (ii) all resource elements used for CSI-RS (or CSI-RS resource elements) that overlap the data resource elements based on the CSI-RS configuration(s). The UE may obtain received symbols from the data resource elements. For de-rate matching, the UE may discard received symbols from the data resource elements that overlap CSI-RS resource elements since data symbols are not sent on these resource elements. The UE may then process (e.g., demodulate and decode) the received symbols from the data resource elements that do not overlap the CSI-RS resource elements.

A UE may perform de-rate matching for all of its CSI-RS configurations. The UE may not be aware of CSI-RS configurations for other UEs in the same cell and may not be able to perform de-rate matching for these unknown CSI-RS configurations. As a result, the UE may process (instead of discard) received symbols from CSI-RS resource elements used by the unknown CSI-RS configurations. Data performance of the UE may be adversely impacted by failing to perform de-rate matching for the unknown CSI-RS configurations. Hence, the UE may be informed of the CSI-RS configurations of other UEs in the same cell to enable the UE to perform de-rate matching for these CSI-RS configurations and avoid performance degradation.

A cell may serve a number of UEs at any given moment. Each UE may be configured with one or more sets of CSI-RS configurations, e.g., at least one set of CSI-RS configurations for each purpose. Each set may include any number of CSI-RS configurations. The cell may need to convey (e.g., via upper-layer signaling) a large number of non-zero-power and zero-power CSI-RS configurations to each UE in order to enable that UE to (i) make measurements of CSI-RS and send CSI feedback and/or perform other functions and (ii) perform de-rate matching for physical channels (e.g., PDSCH) based on all CSI-RS configurations in order to obtain good decoding performance for the physical channels.

The number of UEs served by a cell may change dynamically, e.g., due to continual arrivals and departures of UEs, dynamic cell switching in CoMP, etc. Furthermore, active cells in a given geographic area may change dynamically. For example, in a hyperdense wireless network in which a large number of small low-power cells may exist within the coverage area of a macro cell, some low-power cells may be completely turned off, partially turned on (e.g., turned on only in a limited set of subframes), or fully turned on depending on various factors such as traffic loading, interference conditions, etc. For TDD, an uplink-downlink subframe configuration of a cell may change dynamically, so that downlink subframes and uplink subframes for different cells may change over time. Dynamically changing UEs and/or dynamically changing cells may make it challenging to efficiently manage resources for CSI-RS.

In one aspect of the present disclosure, a UE may be configured with one or more sets of CSI-RS configurations via first signaling, and a base station/cell may send second signaling to the UE to indicate which of its CSI-RS configurations are active. A configured CSI-RS configuration is a CSI-RS configuration that is assigned for use and might be used by a UE. An active CSI-RS configuration is a CSI-RS configuration that is considered for at least one communication task, e.g., rate matching, de-rate matching, etc. There may or may not be actual CSI-RS transmission in an active CSI-RS configuration. The active CSI-RS configurations may include all or a subset of the configured CSI-RS configurations for the UE. The first and second signaling may correspond to signaling at different layers of a protocol stack, signaling sent at different times, signaling sent in different manners, or signaling having different characteristics.

The UE may be configured with CSI-RS configurations via upper-layer signaling (e.g., RRC). However, upper-layer signaling may be relatively slow and may also require more resource overhead. Hence, configured CSI-RS configurations for the UE may be semi-static and may change infrequently, if at all. As disclosed herein, a base station/cell may send lower-layer signaling to indicate which CSI-RS configurations among the configured CSI-RS configurations are active. The lower-layer signaling may be sent via physically layer (PHY) or medium access control (MAC) and may be faster and more efficient than upper-layer signaling. The active CSI-RS configurations may be changed dynamically (e.g., in each subframe) via faster and more efficient lower-layer signaling in PHY or MAC. Improved performance may be obtained by dynamically signaling the active CSI-RS configurations (instead of always assuming that all configured CSI-RS configurations are active) for de-rate matching and other communication tasks.

In one example, active CSI-RS configurations may be indicated or determined on a per subframe basis. The presence of CSI-RS may be subframe dependent for each set of CSI-RS configurations. For example, the impact of each set of CSI-RS configurations on rate matching and de-rate matching may be subframe dependent. Hence, indicating or determining active CSI-RS configurations on a per subframe basis may enable de-rate matching to be properly performed in each subframe based on the active CSI-RS configurations, if any, for the subframe.

Figure 5:
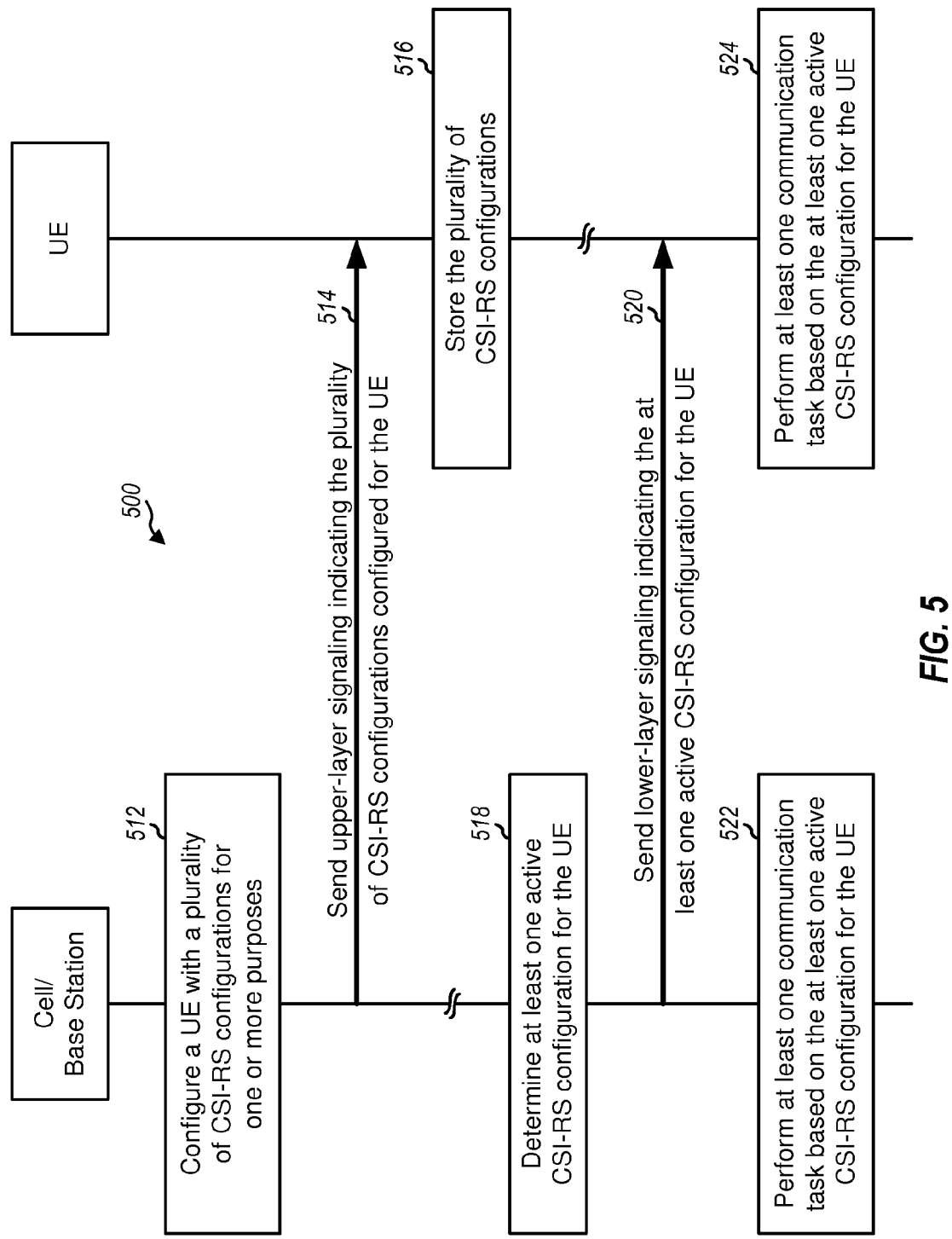
FIG. 5 shows a message flow for signaling active CSI-RS configuration.

FIG. 5 shows an exemplary message flow 500 for configuring and activating CSI-RS configurations. A cell may configure a UE with a plurality of CSI-RS configurations for one or more purposes (step 512). The cell may send upper-layer signaling indicating the plurality of CSI-RS configurations configured for the UE (step 514). The UE may receive the upper-layer signaling and may store the plurality of CSI-RS configurations (step 516). The cell may determine at least one active CSI-RS configuration for the UE (step 518). The cell may send lower-layer signaling indicating the at least one active CSI-RS configuration for the UE (step 520).

The cell may perform at least one communication task based on the at least one active CSI-RS configuration for the UE (step 522). The UE may perform at least one complementary communication task based on the at least one active CSI-RS configuration for the UE (step 524). For example, the cell may perform rate matching and the UE may perform de-rate matching based on the at least one active CSI-RS configuration. As another example, the UE may determine and report CSI and the cell may receive CSI feedback based on the at least one active CSI-RS configuration.

Active CSI-RS configurations may be determined and applied in various manners. In one example, a UE may be configured with five sets of CSI-RS configurations via upper-layer signaling. The UE may receive lower-layer signaling indicating that only the first two sets of CSI-RS configurations are active in a first subframe and that all five sets of CSI-RS configurations are active in a second subframe. The UE may perform communication tasks (e.g., CSI feedback) associated with the first two sets of CSI-RS configurations in the first subframe. The UE may perform communication tasks (e.g., CoMP set management) associated with the five sets of CSI-RS configurations in the second subframe. The UE may also perform de-rate matching based on the first two sets of CSI-RS configurations in the first subframe and based on the five sets of CSI-RS configurations in the second subframe.

As another example, a UE may be configured with two sets of CSI-RS configurations via upper-layer signaling. The first set of CSI-RS configurations may be associated with CSI-RS transmissions every 5 ms and may be present in first and second subframes. The second set of CSI-RS configurations may be associated with CSI-RS transmissions every 10 ms and may be present in the first subframe but not the second subframe. The UE may receive signaling indicating that the two sets of CSI-RS configurations are active. The UE may perform de-rate matching based on the two sets of CSI-RS configurations in the first subframe and based on only the first set of CSI-RS configurations in the second subframe.

As yet another example, a UE may be configured with a first set of CSI-RS configurations for a first cell and a second set of CSI-RS configuration for a second cell. The first and second cells may correspond to two cells in a Node B, two carriers of the same eNB, two cells in two eNBs, etc. The UE may receive signaling indicating that only one set of CSI-RS configurations active. The UE may then perform communication tasks related to the active set of CSI-RS configurations.

Signaling may be sent in various manners to indicate active CSI-RS configurations for a given UE. In one example, unicast signaling indicating active CSI-RS configurations may be sent specifically to the UE. The unicast signaling may be sent (i) when triggered by one or more events, e.g., when there is a change in active CSI-RS configurations for the UE, or (ii) periodically, e.g., in every X subframes, or (iii) prior to or concurrent with transmission of CSI-RS. In another example, multicast signaling indicating active CSI-RS configurations may be sent to a group of UEs (e.g., in the same cell) that might be affected by the active CSI-RS configurations. The group of UEs may monitor a multicast/groupcast channel (e.g., similar to DCI 3/3A group power control sent on the PDCCH in LTE) for signaling indicating active CSI-RS configurations and may perform de-rate matching and/or other communication tasks based on the signaling. In yet another example, broadcast signaling indicating active CSI-RS configurations may be sent to all UEs in a cell. All UEs in the cell may monitor a broadcast channel for signaling indicating active CSI-RS configurations. The signaling may be broadcast periodically, e.g., every X subframes, where X may be any integer value.

In one example, a base station/cell may send signaling on the PDCCH and/or ePDCCH to indicate which CSI-RS configurations are active. In another example, MAC-based signaling may be sent to indicate active CSI-RS configurations. For example, MAC-based signaling similar to that used to indicate activation/deactivation of a carrier may be sent to indicate active CSI-RS configurations. In yet another example, signaling may be sent to indicate semi-persistently active CSI-RS configurations and may be referred to as semi-persistent signaling. For example, the semi-persistent signaling for active CSI-RS configurations may be sent in similar manner as semi-persistent scheduling (SPS) signaling used to assign resources to a UE for an extended period of time for traffic data transmission. SPS signaling may be used to reduce signaling overhead in comparison to dynamic scheduling in which a resource grant is sent for each transmission of data. Semi-persistent signaling may be used to convey active CSI-RS configurations for an extended period of time. For example, the active CSI-RS configurations may be valid until a termination time is reached or until signaling is sent to cancel the active CSI-RS configurations.

In one example, signaling may indicate whether each set of CSI-RS configurations is active. For example, a UE may be configured with N sets of CSI-RS configurations, where N may be any integer value of one or greater. A bitmap of N bits may be defined and may include one bit for each set of CSI-RS configurations configured for the UE. Each bit of the bitmap may be set to (i) a first value (e.g., '1') if the set of CSI-RS configurations associated with that bit is active or (ii) a second value (e.g., '0') if the associated set of CSI-RS configurations is not active.

In another example, sets of CSI-RS configurations for a UE may be organized into groups, with each group including one or more sets of CSI-RS configurations. For example, a UE may be configured with N sets of CSI-RS configurations, which may be organized into K groups, where in general 1≤K≤N. Signaling may be sent to indicate which groups of CSI-RS configurations are active. A bitmap of K bits may be defined and may include one bit for each group. Each bit of the bitmap may be set to (i) a first value (e.g., '1') if the group of CSI-RS configurations associated with that bit is active or (ii) a second value (e.g., '0') if the associated group of CSI-RS configurations is not active.

A UE may have one or more sets of CSI-RS configurations that may always be active for the UE. For example, one set of CSI-RS configurations for CSI channel measurement and one set of CSI-RS configurations for interference measurement may always be active for the UE. As another example, all non-zero-power CSI-RS configurations for the UE may always be active. In one example, the sets of CSI-RS configurations for the UE may be arranged into (i) a primary group of CSI-RS configurations that is always active for the UE and (ii) one or more secondary groups of CSI-RS configurations that can be activated or deactivated for the UE. Signaling may be sent for only the secondary group(s) to indicate which groups or sets of CSI-RS configurations in the secondary group(s) are active for the UE.

A UE may perform de-rate matching by taking into account CSI-RS in various manners. In one example, the UE may perform de-rate matching only for active CSI-RS configurations and not for inactive CSI-RS configurations. In another example, the UE may perform de-rate matching depending on CSI-RS types. Each CSI-RS type may be associated with a different purpose. For example, the UE may be configured with one or more sets of CSI-RS configurations for CSI feedback, one or more sets of CSI-RS configurations for CoMP set management, one or more sets of CSI-RS configurations for RLM/RRM, one or more sets of zero-power CSI-RS configurations, one or more sets of non-zero-power CSI-RS configurations, etc. CSI-RS configurations of different types may be signaled and/or handled differently for de-rate matching. For example, the UE may perform de-rate matching for CSI-RS configurations for CSI feedback and CoMP set management and may not perform de-rate matching for CSI-RS configurations for RLM/RRM.

A UE may perform de-rate matching for one or more physical channels based on its active CSI-RS configurations and/or configured CSI-RS configurations. For example, the UE may perform de-rate matching for the PDSCH, or the ePDCCH, or both the PDSCH and ePDCCH, or some other physical channel, or any combination of physical channels. The UE may perform de-rate matching in the same manner for all physical channels. Alternatively, the UE may perform de-rate matching in different manners for different physical channels.

The UE may also perform de-rate matching in different manners for different types of a given physical channel. For example, different types of PDSCH may be supported. The different PDSCH types may include (i) broadcast PDSCH sent to all UEs versus unicast PDSCH sent to a specific UE, (ii) PDSCH scheduled via a common search space in the control region of a downlink subframe versus PDSCH scheduled via a UE-specific search space in the control region, (iii) PDSCH sent by multiple cells for CoMP versus PDSCH sent by one cell without CoMP, (iv) PDSCH sent in almost blank subframes (ABS) versus PDSCH sent in non-ABS subframes, (v) PDSCH sent without a corresponding control channel (e.g., semi-persistently scheduled PDSCH) versus PDSCH sent with corresponding control channel, and (vi) other types of PDSCH.

In one example, a UE may perform de-rate matching in a similar manner for PDSCH of all types. In another example, a UE may perform de-rate matching in different manners for different types of PDSCH. For example, the UE may perform de-rate matching for a broadcast PDSCH based on all configured CSI-RS configurations for the UE (instead of based on only active CSI-RS configurations). The UE may perform de-rate matching for a unicast PDSCH based on only active CSI-RS configurations for the UE. As another example, the UE may perform de-rate matching for a PDSCH without a corresponding control channel based on all configured CSI-RS configurations. The UE may perform de-rate matching for a PDSCH with a corresponding control channel based on only active CSI-RS configurations, which may be indicated via the corresponding control channel.

A UE may perform de-rate matching for the ePDCCH in various manners. In one example, the UE may perform de-rate matching for the ePDCCH based on only active CSI-RS configurations. In another example, the UE may perform de-rate matching for the ePDCCH based on all configured CSI-RS configurations.

In one example, a UE may perform de-rate matching in similar manner for the PDSCH and ePDCCH. For example, the UE may perform de-rate matching for the PDSCH and ePDCCH based on the active CSI-RS configurations instead of the configured CSI-RS configurations. In another example, the UE may perform de-rate matching in different manners for the PDSCH and ePDCCH. For example, the UE may perform de-rate matching for the PDSCH based on the active CSI-RS configurations and may perform de-rate matching for the ePDCCH based on the configured CSI-RS configurations.

For CSI feedback, a UE may be configured with (i) one or more sets of CSI-RS configurations for channel estimation and (ii) one or more sets of CSI-RS configurations for interference estimation. The UE may perform channel estimation based on the set(s) of CSI-RS configurations designated for channel estimation and may perform interference estimation based on the set(s) of CSI-RS configurations designated for interference estimation. The UE may also perform channel estimation based on the CRS configurations designated for channel estimation and may not be configured with any CSI-RS configurations for interference estimation.

In one example, a UE may be signaled one or more sets of CSI-RS configurations for one or more neighbor cells. The UE may estimate interference due to the CSI-RS from the neighbor cell(s) based on the CSI-RS configurations for the neighbor cell(s). The UE may cancel the estimated interference due to the CSI-RS from the neighbor cell(s) prior to making channel measurements and/or interference measurements based on the CSI-RS from the serving cell. Interference cancellation of the CSI-RS from the neighbor cell(s) may improve CSI feedback, and CoMP set management, especially in a hyperdense network with many cells.

A UE may perform decoding for one or more physical channels (e.g., the PDSCH and/or ePDCCH) based on CSI-RS configurations for one or more neighbor cells. A serving cell of the UE may not perform rate matching for the PDSCH and/or ePDCCH based on the CSI-RS configurations for the neighbor cell(s) and may transmit the PDSCH and/or ePDCCH on resource elements used for CSI-RS by the neighbor cell(s). The UE may cancel the impact of the CSI-RS from the neighbor cell(s) based on the CSI-RS configurations for the neighbor cell(s). For example, the UE may estimate interference due to the CSI-RS from the neighbor cell(s) based on the CSI-RS configurations for the neighbor cell(s). The UE may then cancel the estimated interference due to the CSI-RS from the neighbor cell(s) to obtain interference-canceled symbols for the PDSCH and/or ePDCCH. The UE may then decode the interference-canceled symbols to recover data sent on the PDSCH and/or ePDCCH.

The techniques described herein may provide various advantages. First, a UE may perform de-rate matching for one or more physical channels based on active CSI-RS configurations, which may change frequently to reflect the dynamics of network operating conditions. Second, the UE may perform communication tasks such as de-rate matching, CSI feedback, CoMP set management, etc., based on the active CSI-RS configurations instead of the configured CSI-RS configurations. Improved performance may be obtained by performing communication tasks based on the active CSI-RS configurations. Improved network efficiency may be obtained with the ability to dynamically select and indicate active CSI-RS configurations.

Figures 6, 7:
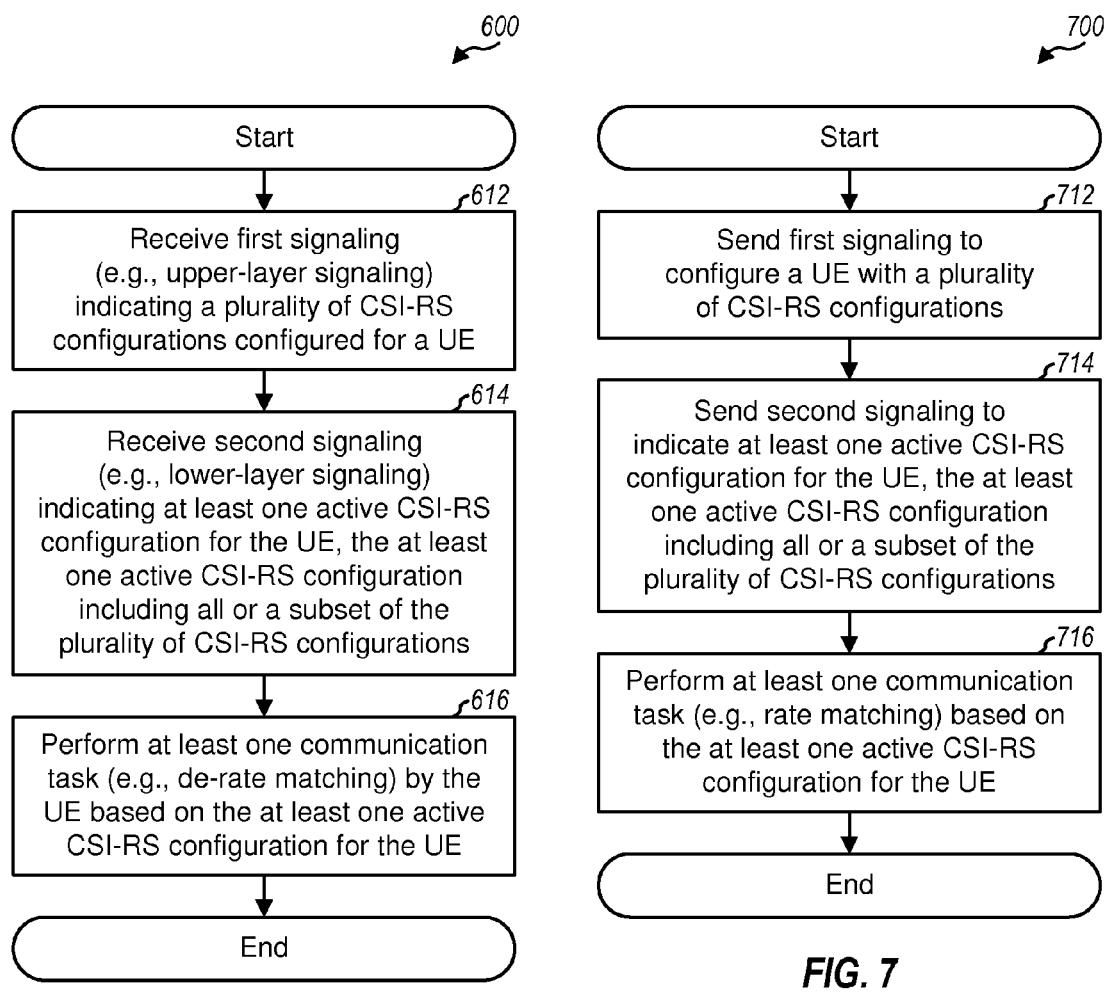
FIG. 6 shows a process for receiving CSI-RS by a UE.
FIG. 7 shows a process for transmitting CSI-RS by a cell or base station.

FIG. 6 shows an exemplary process 600 for receiving CSI-RS. Process 600 may be performed by a UE (as described below) or by some other entity. The UE may receive first signaling indicating a plurality of CSI-RS configurations configured for the UE (block 612). The UE may receive second signaling indicating at least one active CSI-RS configuration for the UE (block 614). The at least one active CSI-RS configuration may include all or a subset of the plurality of CSI-RS configurations. The second signaling may relate to an individual CSI-RS configuration, or a set of CSI-RS configurations, or a group of CSI-RS configurations. The UE may perform at least one communication task based on the at least one active CSI-RS configuration for the UE (block 616).

In one example, the UE may receive upper-layer signaling (e.g., RRC signaling) indicating the plurality of CSI-RS configurations configured for the UE. The UE may receive lower-layer signaling indicating the at least one active CSI-RS configuration for the UE. The second signaling may comprise control information sent on a physical channel (e.g., the PDCCH or ePDCCH) or via MAC. The plurality of CSI-RS configurations may be statically or semi-statically configured for the UE and may change infrequently (e.g., after some minimum number of frames or subframes) or not at all during a communication session for the UE. The at least one active CSI-RS configuration may change dynamically (e.g., possibly at subframe level) during the communication session for the UE.

The second signaling may be sent in various manners. The UE may receive the second signaling via a broadcast channel sent to all UEs in a cell, or a unicast channel sent to the UE, or a multicast channel sent to a group of UEs including the UE. The UE may also receive signaling conveying the active CSI-RS configurations and the configured CSI-RS configurations in other manners.

In one example, the plurality of CSI-RS configurations may include at least two sets of CSI-RS configurations. Each set of CSI-RS configurations may be associated with one or more communication tasks by the UE, e.g., de-rate matching, CSI feedback, CoMP set management, RLM/RRM, etc. Each set may include one or more CSI-RS configurations. In one example, the second signaling may comprise a bitmap with at least two bits for the at least two sets of CSI-RS configurations. Each bit of the bitmap may indicate whether an associated set of CSI-RS configurations is active for the UE.

In another example, at least one group of CSI-RS configurations may be formed based on the at least two sets of CSI-RS configurations. Each group of CSI-RS configurations may include at least one set of CSI-RS configurations. The second signaling may comprise a bitmap with at least one bit for the at least one group of CSI-RS configurations. Each bit of the bitmap may indicate whether an associated group of CSI-RS configurations is active for the UE. The second signaling indicating at least one active CSI-RS configuration for the UE may also be sent in other manners.

All or a subset of the plurality of CSI-RS configurations may be activated and deactivated for the UE. In one example, the plurality of CSI-RS configurations may include (i) a first subset of CSI-RS configurations that is always active for the UE and (ii) a second subset of CSI-RS configurations that can be activated or deactivated for the UE. The second signaling may indicate at least one active CSI-RS configuration in the second subset of CSI-RS configurations.

In one example, the plurality of CSI-RS configurations may include a CSI-RS configuration that is active for a first communication task (e.g., de-rate matching) and is inactive for a second communication task (e.g., CSI feedback). In another example, the plurality of CSI-RS configurations may include a CSI-RS configuration that can be activated or deactivated for a first communication task and is always active for a second communication task. In yet another example, the plurality of CSI-RS configurations may include a first CSI-RS configuration that can be activated or deactivated for a first communication task and a second CSI-RS configuration that is always active for a second communication task. In yet another example, the plurality of CSI-RS configurations may include a first set of CSI-RS configurations for a first cell and a second set of CSI-RS configurations for a second cell. The at least one active CSI-RS configuration for the UE may comprise either the first or second set of CSI-RS configurations. The active CSI-RS configurations may also be defined in other manners.

In one example of block 616, the UE may determine CSI feedback based on the at least one active CSI-RS configuration for the UE. Alternatively or additionally, the UE may perform de-rate matching for at least one physical channel based on the at least one active CSI-RS configuration for the UE. In one example, the UE may perform de-rate matching for a first physical channel (e.g., the PDSCH or unicast PDSCH) based on the at least one active CSI-RS configuration for the UE. The UE may perform de-rate matching for a second physical channel (e.g., the ePDCCH or broadcast PDSCH) based on the plurality of CSI-RS configurations configured for the UE. In another example, the UE may perform de-rate matching in the same manner for the first and second physical channels based on the at least one active CSI-RS configuration. The UE may also estimate interference based on the at least one active CSI-RS configuration for the UE.

In one example, the UE may determine CSI-RS types of the plurality of CSI-RS configurations. The UE may perform a communication task (e.g., de-rate matching) by considering CSI-RS configurations of a first CSI-RS type and without considering CSI-RS configurations of a second CSI-RS type.

In one example, the UE may receive signaling indicating at least one CSI-RS configuration for at least one neighbor cell. The UE may perform interference cancellation for CSI-RS from the neighbor cell(s) based on the at least one CSI-RS configuration for the neighbor cell(s). The UE may determine CSI feedback and/or decode at least one physical channel (e.g., the PDSCH and/or ePDCCH) after performing interference cancellation for the CSI-RS from the neighbor cell(s).

FIG. 7 shows an exemplary process 700 for sending CSI-RS. Process 700 may be performed by a cell/base station (as described below) or by some other entity. The cell may send first signaling to configure a UE with a plurality of CSI-RS configurations (block 712). The cell may send second signaling to indicate at least one active CSI-RS configuration for the UE (block 714). The at least one active CSI-RS configuration may include all or a subset of the plurality of CSI-RS configurations. The cell may perform at least one communication task based on the at least one active CSI-RS configuration for the UE (block 716).

In one example, the cell may send upper-layer signaling (e.g., RRC signaling) to configure the UE with the plurality of CSI-RS configurations. The cell may send lower-layer signaling to indicate the at least one active CSI-RS configuration for the UE. The lower-layer signaling may comprise control information sent on a physical channel (e.g., the PDCCH or ePDCCH) or via MAC. The cell may send the second signaling via a broadcast channel sent to all UEs in a cell, or a unicast channel sent to the UE, or a multicast channel sent to a group of UEs including the UE. The second signaling may comprise a bitmap with one bit for each set of CSI-RS configurations or one bit for each group of at least one set of CSI-RS configurations. The second signaling may also comprise other information.

All or a subset of the plurality of CSI-RS configurations may be activated and deactivated for the UE. In one example, the plurality of CSI-RS configurations may include (i) a first subset of CSI-RS configurations that is always active for the UE and (ii) a second subset of CSI-RS configurations that can be activated or deactivated for the UE. The second signaling may indicate at least one active CSI-RS configuration in the second subset of CSI-RS configurations.

In one example, the plurality of CSI-RS configurations may include a CSI-RS configuration that is active for a first communication task (e.g., rate matching) and is inactive for a second communication task (e.g., CSI reporting). In another example, the plurality of CSI-RS configurations may include a CSI-RS configuration that can be activated or deactivated for a first communication task and is always active for a second communication task. In yet another example, the plurality of CSI-RS configurations may include (i) a first CSI-RS configuration that can be activated or deactivated for a first communication task and (ii) a second CSI-RS configuration that is always active for a second communication task. In yet another example, the plurality of CSI-RS configurations may include a first set of CSI-RS configurations for a first cell and a second set of CSI-RS configurations for a second cell. The at least one active CSI-RS configuration for the UE may include either the first or second set of CSI-RS configurations.

In one example of block 716, the cell may receive CSI feedback determined by the UE based on the at least one active CSI-RS configuration for the UE. Alternatively or additionally, the cell may perform rate matching for at least one physical channel based on the at least one active CSI-RS configuration for the UE. In one example, the cell may perform rate matching for (i) a first physical channel (e.g., the PDSCH or unicast PDSCH) based on the at least one active CSI-RS configuration for the UE and (ii) a second physical channel (e.g., the ePDCCH or broadcast PDSCH) based on the plurality of CSI-RS configurations configured for the UE. In another example, the cell may perform rate matching in similar manner for the first and second physical channels.

In one example, the cell may determine the CSI-RS types of the plurality of CSI-RS configurations. The cell may perform a communication task (e.g., rate matching) based on CSI-RS configurations of a first CSI-RS type and not based on CSI-RS configurations of a second CSI-RS type.

In one example, the cell may send signaling indicating at least one CSI-RS configuration for at least one neighbor cell. The UE may perform interference cancellation for CSI-RS from the neighbor cell(s) based on the at least one CSI-RS configuration for the neighbor cell(s).

Figure 8:
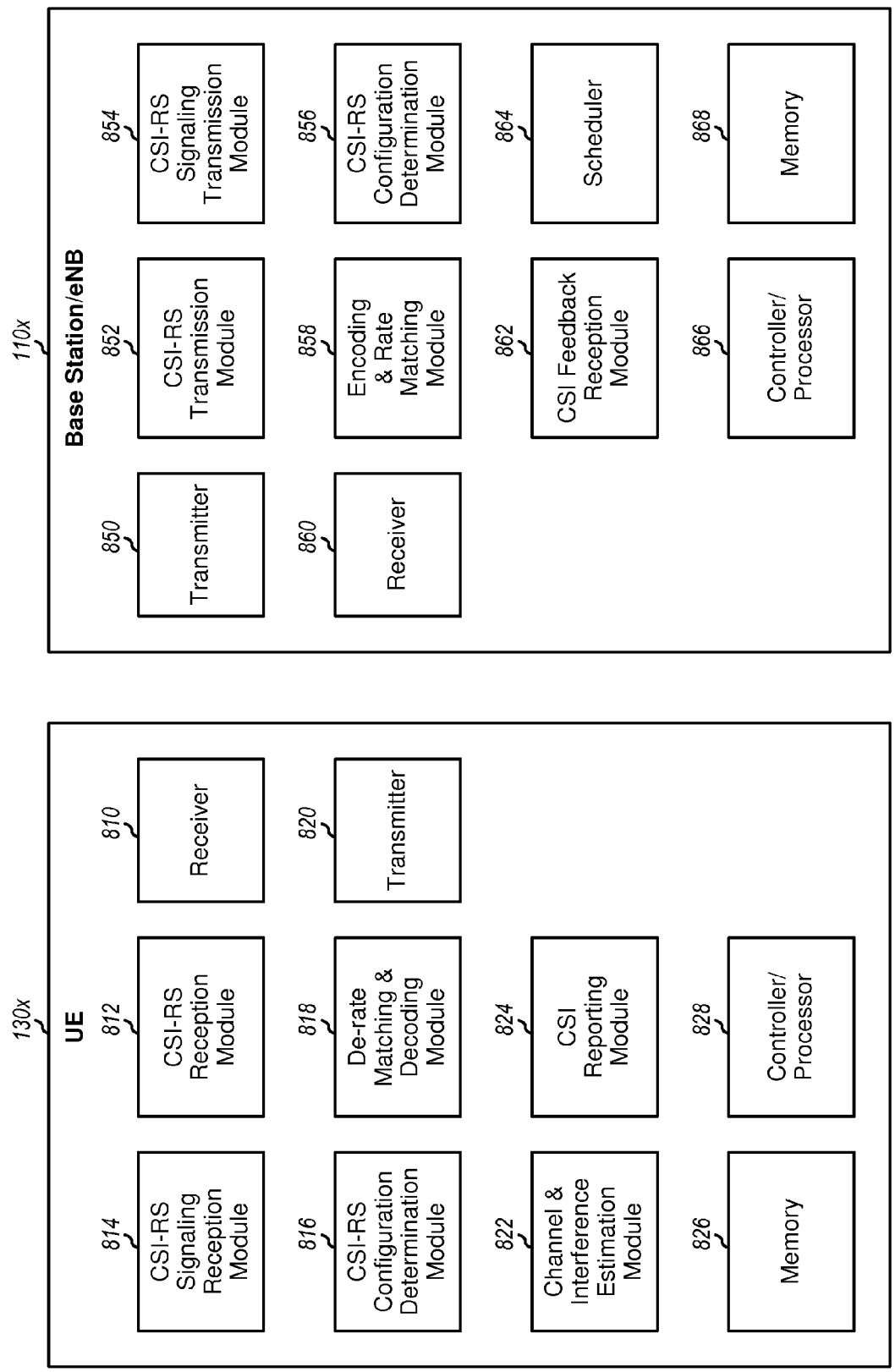
FIG. 8 shows a block diagram of a base station and a UE.

FIG. 8 shows a block diagram of a UE 130x and a base station/eNB 110x, which may be one of the UEs and one of the eNBs in FIG. 1. Within UE 130x, a receiver 810 may receive signals transmitted by base stations, relays, etc. A module 812 may receive reference signals (e.g., CRS, CSI-RS, etc.) from base station 110x and/or other base stations. A module 814 may receive upper-layer signaling conveying CSI-RS configurations configured for UE 130x and lower-layer signaling conveying active CSI-RS configurations for UE 130x. A module 816 may determine configured CSI-RS configurations and active CSI-RS configurations for UE 130x based on the received signaling. A module 818 may perform de-rate matching based on the active CSI-RS configurations and may perform decoding after de-rate matching. A module 822 may perform channel estimation based on active CSI-RS configurations for UE 130x designated for channel estimation. Module 822 may also perform interference estimation based on active CSI-RS configurations designated for interference estimation. Module 818 and/or 822 may perform interference cancellation for CSI-RS from neighbor cells based on CSI-RS configuration for the neighbor cells prior to performing decoding or channel estimation. A module 824 may determine CSI feedback based on the measurements for channel estimation and interference estimation. Module 824 may report the CSI for one or more carriers of interest. A transmitter 820 may transmit the CSI as well as other information. The various modules within UE 130x may operate as described above. A controller/processor

828 may direct the operation of various modules within UE 130x. A memory 826 may store data and program codes for UE 130x.

Within base station 110x, a module 856 may configure UE 130x with CSI-RS configurations and may determine active CSI-RS configurations for UE 130x. A module 854 may generate upper-layer signaling conveying the configured CSI-RS configurations and lower-layer signaling conveying the active CSI-RS configurations for UE 130x. Module 854 may send the signaling to UE 130x. A module 858 may encode data and/or control information sent to UE 130x and may perform rate matching based on the active CSI-RS configurations for UE 130x. A module 852 may generate and send CSI-RS based on the active CSI-RS configurations for UE 130x. A transmitter 850 may transmit one or more downlink signals comprising CSI-RS, signaling, data, and/or other information. A receiver 860 may receive uplink signals transmitted by UE 130x and other UEs. A module 862 may receive CSI feedback determined by UE 130x based on the active CSI-RS configurations. A module 864 may schedule UE 130x for data transmission based on the CSI. The various modules within base station 110x may operate as described above. A controller/processor 866 may direct the operation of various modules within base station 110x. A memory 868 may store data and program codes for base station 110x.

The modules in FIG. 8 may comprise processors, electronic devices, hardware devices, electronic components, logical circuits, memories, software codes, firmware codes, etc., or any combination thereof.

Figure 9:
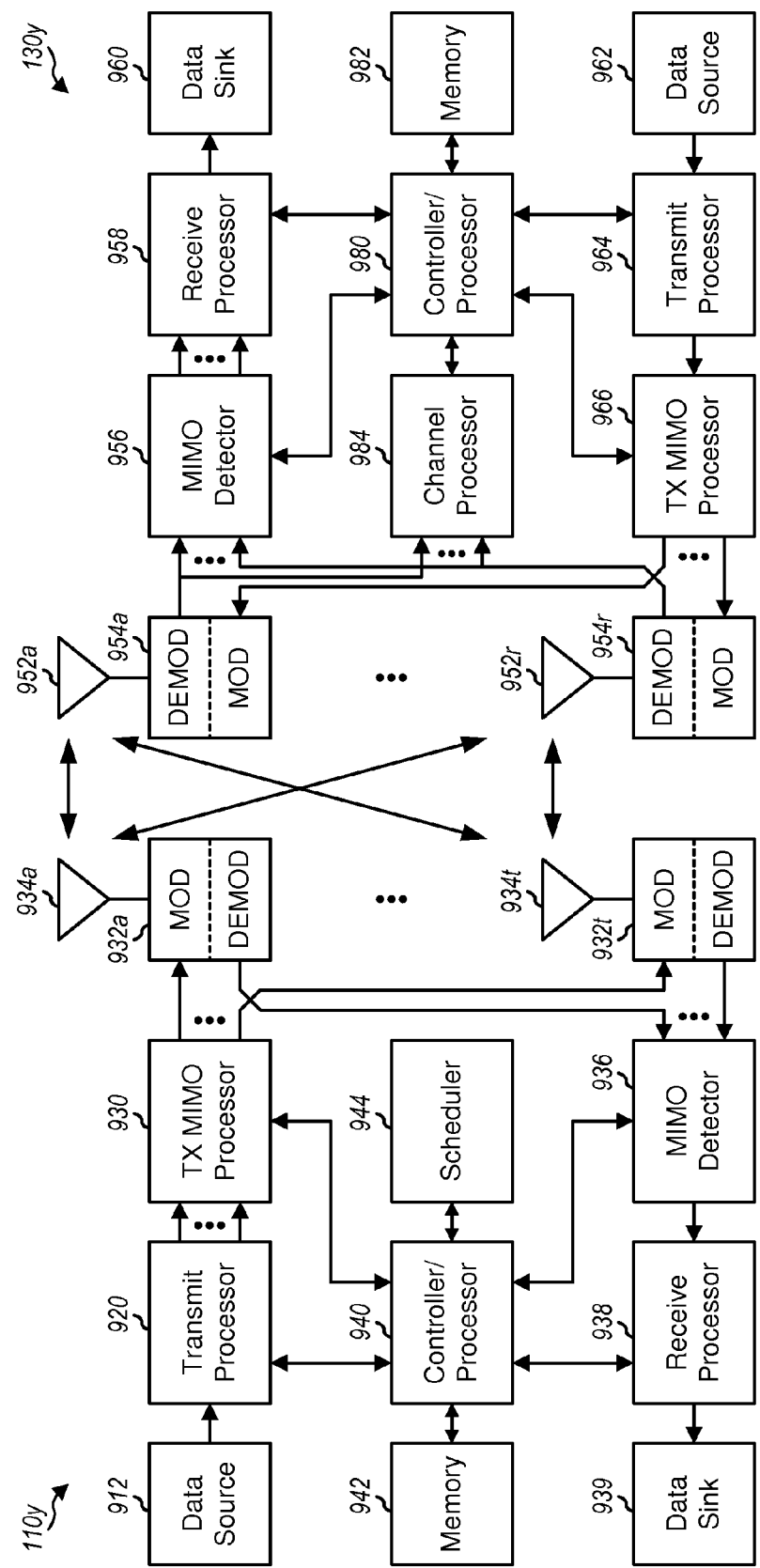
FIG. 9 shows another block diagram of a base station and a UE.

FIG. 9 shows a block diagram of a base station/eNB 110y and a UE 130y, which may be one of the base stations/eNBs and one of the UEs in FIG. 1. Base station 110y may be equipped with T antennas 934a through 934t, and UE 130y may be equipped with R antennas 952a through 952r, where in general T≥1 and R≥1.

At base station 110y, a transmit processor 920 may receive data from a data source 912 for transmission to one or more UEs, process (e.g., encode and modulate) the data for each UE based on one or more modulation and coding schemes selected for that UE, and provide data symbols for all UEs. Transmit processor 920 may also process control information (e.g., scheduling grants, configuration messages, signaling, etc.) and provide control symbols. The control information may include upper-layer signaling to configure UE 130y with CSI-RS configurations and lower-layer signaling indicating active CSI-RS configurations for UE 130y. Processor 920 may also generate reference symbols for one or more reference signals such as CRS, CSI-RS, etc. A transmit (TX) multiple-input multiple-output (MIMO) processor 930 may precode the data symbols, the control symbols, and/or the reference symbols (if applicable) and may provide T output symbol streams to T modulators (MOD) 932a through 932t. Each modulator 932 may process its output symbol stream (e.g., for OFDM, etc.) to obtain an output sample stream. Each modulator 932 may further condition (e.g., convert to analog, amplify, filter, and upconvert) its output sample stream to obtain a downlink signal. T downlink signals from modulators 932a through 932t may be transmitted via T antennas 934a through 934t, respectively.

At UE 130y, antennas 952a through 952r may receive the downlink signals from base station 110y and/or other base stations and may provide received signals to demodulators (DEMODs) 954a through 954r, respectively. Each demodulator 954 may condition (e.g., filter, amplify, downconvert, and digitize) its received signal to obtain input samples. Each demodulator 954 may further process the input samples (e.g., for OFDM, etc.) to obtain received symbols. A MIMO detector 956 may obtain received symbols from all R demodulators 954a through 954r, perform MIMO detection on the received symbols, and provide detected symbols. A receive processor 958 may process (e.g., demodulate and decode) the detected symbols to obtain decoded data. Receive processor 958 may obtain upper-layer signaling configuring UE 130y with CSI-RS configurations and lower-layer signaling indicating active CSI-RS configurations for UE 130y. Receive processor 958 may perform de-rate matching for the PDSCH, ePDCCH, and/or other physical channels based on active CSI-RS configurations and/or configured CSI-RS configurations for UE 130y. Receive processor 958 may provide decoded data for UE 130y to a data sink 960 and provide decoded control information to a controller/processor 980. A channel processor 984 may perform channel estimation and/or interference estimation for different carriers based on CSI-RS received on these carriers based on the active CSI-RS configurations for UE 130y. Channel processor 984 and/or controller 980 may determine CSI for each carrier of interest based on the measurements for channel estimation and/or interference estimation.

On the uplink, at UE 130y, a transmit processor 964 may receive and process data from a data source 962 and control information (e.g., CSI feedback, etc.) from controller/processor 980. Processor 964 may also generate reference symbols for one or more reference signals. The symbols from transmit processor 964 may be precoded by a TX MIMO processor 966 if applicable, further processed by modulators 954a through 954r (e.g., for SC-FDM, OFDM, etc.), and transmitted to base station 110y. At base station 110y, the uplink signals from UE 130y and other UEs may be received by antennas 934, processed by demodulators 932, detected by a MIMO detector 936 if applicable, and further processed by a receive processor 938 to obtain decoded data and control information sent by UE 130y and other UEs. Processor 938 may provide the decoded data to a data sink 939 and the decoded control information to controller/processor 940.

Controllers/processors 940 and 980 may direct the operation at base station 110y and UE 130y, respectively. Processor 940 and/or other processors and modules at base station 110y may perform or direct process 700 in FIG. 7, the portion of message flow 500 in FIG. 5 for a cell, and/or other processes for the techniques described herein. Processor 980 and/or other processors and modules at UE 130y may perform or direct process 600 in FIG. 6, the portion of message flow 500 in FIG. 5 for a UE, and/or other processes for the techniques described herein. Memories 942 and 982 may store data and program codes for base station 110y and UE 130y, respectively. A scheduler 944 may schedule UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    monitoring, by a user equipment (UE), a control channel of an active cell, wherein the UE is configured to receive signaling from the active cell via the control channel to indicate a channel state information reference signal (CSI-RS) configuration for at least one other UE in the active cell;
    receiving first signaling indicating a plurality of CSI-RS configurations configured for the UE, wherein the plurality of CSI-RS configurations comprise at least two sets of CSI-RS configurations, each set of the at least two sets of CSI-RS configurations including one or more respective CSI-RS configurations;
    receiving, via the control channel, second signaling indicating at least one active set of CSI-RS configurations for the UE, the at least one active set of CSI-RS configurations including a subset of the plurality of CSI-RS configurations configured for the UE; and
    performing, by the UE, an optimized de-rate matching process for one or more first subframes based in part on the at least one active set of CSI-RS configurations indicated by the second signaling and on the CSI-RS configurations for the at least one other UE.

2. The method of claim 1, wherein the receiving first signaling comprises receiving upper-layer signaling indicating the plurality of CSI-RS configurations configured for the UE, and wherein the receiving second signaling comprises receiving lower-layer signaling indicating the at least one active set of CSI-RS configurations for the UE.

3. The method of claim 1, wherein the receiving first signaling comprises receiving Radio Resource Control (RRC) signaling indicating the plurality of CSI-RS configurations configured for the UE, and wherein the receiving second signaling comprises receiving control information on a physical channel or via Medium Access Control (MAC) indicating the at least one active set of CSI-RS configurations for the UE.

4. The method of claim 1, wherein the plurality of CSI-RS configurations are statically or semi-statically configured for the UE, and wherein the at least one active set of CSI-RS configurations is dynamically signaled to the UE.

5. The method of claim 1, wherein the plurality of CSI-RS configurations comprise a first set of CSI-RS configurations that is always active for the UE and a second set of CSI-RS configurations that can be activated or deactivated for the UE, and wherein the receiving the second signaling comprises receiving the second signaling indicating the at least one active set of CSI-RS configurations in the second set of CSI-RS configurations.

6. The method of claim 1, wherein the plurality of CSI-RS configurations comprise a CSI-RS configuration that is active for a first communication task and is inactive for a second communication task.

7. The method of claim 1, wherein the plurality of CSI-RS configurations comprise a CSI-RS configuration that can be activated or deactivated for a first communication task and is always active for a second communication task.

8. The method of claim 1, wherein the plurality of CSI-RS configurations comprise a first CSI-RS configuration that can be activated or deactivated for a first communication task and a second CSI-RS configuration that is always active for a second communication task.

9. The method of claim 1, wherein the plurality of CSI-RS configurations comprise a first set of CSI-RS configurations for a first cell and a second set of CSI-RS configurations for a second cell, and wherein the at least one active set of CSI-RS configurations for the UE comprises either the first or second set of CSI-RS configurations.

10. The method of claim 1, wherein each set of CSI-RS configurations is associated with one or more communication tasks by the UE.

11. The method of claim 10, wherein the second signaling comprises a bitmap with at least two bits for the at least two sets of CSI-RS configurations, each bit of the bitmap indicating whether an associated set of CSI-RS configurations is active for the UE.

12. The method of claim 10, wherein at least one group of CSI-RS configurations is formed based on the at least two sets of CSI-RS configurations, each group of CSI-RS configurations including at least one set of CSI-RS configurations, and wherein the second signaling comprises a bitmap with at least one bit for the at least one group of CSI-RS configurations, each bit of the bitmap indicating whether an associated group of CSI-RS configurations is active for the UE.

13. The method of claim 1, wherein the receiving second signaling comprises receiving the second signaling via a broadcast channel sent to all UEs in a cell or a multicast channel sent to a group of UEs including the UE.

14. The method of claim 1, further comprising determining CSI feedback based on the at least one active set of CSI-RS configurations for the UE.

15. The method of claim 1, further comprising:
performing de-rate matching for a first physical channel based on the at least one active set of CSI-RS configurations for the UE, and
performing de-rate matching for a second physical channel based on the plurality of CSI-RS configurations configured for the UE.

16. The method of claim 1, further comprising estimating interference based on the at least one active set of CSI-RS configurations for the UE.

17. The method of claim 1, further comprising maintaining a set of cells selectable to serve the UE based on the at least one active set of CSI-RS configurations for the UE.

18. The method of claim 1, further comprising:
determining CSI-RS types of the plurality of CSI-RS configurations, and
performing the de-rate matching by considering CSI-RS configurations of a first CSI-RS type and without considering CSI-RS configurations of a second CSI-RS type.

19. The method of claim 1, further comprising:
receiving signaling indicating at least one CSI-RS configuration for at least one neighbor cell; and
performing interference cancellation for CSI-RS from the at least one neighbor cell based on the at least one CSI-RS configuration for the at least one neighbor cell.

20. An apparatus for wireless communication, comprising:
at least one processor configured to:
monitor a control channel of an active cell, wherein a user equipment (UE) is configured to receive signaling from the active cell via the control channel to indicate a channel state information reference signal (CSI-RS) configuration for at least one other UEs in the active cell;
receive first signaling indicating a plurality of CSI-RS configurations configured for the UE, wherein the plurality of CSI-RS configurations comprise at least two sets of CSI-RS configurations, each set of the at least two sets of CSI-RS configurations including one or more respective CSI-RS configurations;
receive, via the control channel, second signaling indicating at least one active set of CSI-RS configurations for the UE, the at least one active set of CSI-RS configurations including a subset of the plurality of CSI-RS configurations configured for the UE; and
perform, by the UE, an optimized de-rate matching process for one or more first subframes based in part on the at least one active set of CSI-RS configurations indicated by the second signaling and on the CSI-RS configuration for the at least one other UE; and
a memory coupled to the at least one processor.

21. The apparatus of claim 20, wherein the at least two sets of CSI-RS configurations further comprise a first set of CSI-RS configurations that is always active for the UE and a second set of CSI-RS configurations that can be activated or deactivated for the UE, and wherein the at least one processor is configured to receive the second signaling indicating at least one active CSI-RS configuration in the second set of CSI-RS configurations.

22. The apparatus of claim 20, wherein the at least one processor is configured to determine CSI feedback based on the at least one active set of CSI-RS configurations for the UE.

23. The apparatus of claim 20, wherein the at least one processor is configured to perform de-rate matching for at least one physical channel based on the at least one active set of CSI-RS configurations for the UE.

24. An apparatus for wireless communication, comprising:
means for monitoring, by a user equipment (UE), a control channel of an active cell, wherein the UE is configured to receive signaling from the active cell via the control channel to indicate a channel state information reference signal (CSI-RS) configuration for at least one other UE in the active cell;
means for receiving first signaling indicating a plurality of CSI-RS configurations configured for the UE, wherein the plurality of CSI-RS configurations comprise at least two sets of CSI-RS configurations, each set of the at least two sets of CSI-RS configurations including one or more respective CSI-RS configurations;
means for receiving, via the control channel, second signaling indicating at least one active set of CSI-RS configurations for the UE, the at least one active set of CSI-RS configurations including a subset of the plurality of CSI-RS configurations configured for the UE; and
means for performing, by the UE, an optimized de-rate matching process for one or more first subframes based in part on the at least one active set of CSI-RS configurations indicated by the second signaling and on the CSI-RS configuration for the at least one other UE.

25. The apparatus of claim 24, wherein the at least two sets of CSI-RS configurations further comprise a first set of CSI-RS configurations that is always active for the UE and a second set of CSI-RS configurations that can be activated or deactivated for the UE, and wherein the means for receiving the second signaling comprises means for receiving the second signaling indicating at least one active CSI-RS configuration in the second set of CSI-RS configurations.

26. The apparatus of claim 24, further comprising means for determining CSI feedback based on the at least one active set of CSI-RS configurations for the UE.

27. The apparatus of claim 24, further comprising means for performing de-rate matching for at least one physical channel based on the at least one active set of CSI-RS configurations for the UE.

28. A computer program product, comprising:
a non-transitory computer-readable medium comprising:
code for causing at least one processor to monitor, by a user equipment (UE), a control channel of an active cell, wherein the UE is configured to receive signaling from the active cell via the control channel to indicate a channel state information reference signal (CSI-RS) configuration for at least one other UE in the active cell;
code for causing the at least one processor to receive first signaling indicating a plurality of CSI-RS configurations configured for the UE, wherein the plurality of CSI-RS configurations comprise at least two sets of CSI-RS configurations, each set of the at least two sets of CSI-RS configurations including one or more respective CSI-RS configurations;
code for causing the at least one processor to receive, via the control channel, second signaling indicating at least one active set of CSI-RS configurations for the UE, the at least one active set of CSI-RS configurations including a subset of the plurality of CSI-RS configurations configured for the UE; and
code for causing the at least one processor to perform, by the UE, an optimized de-rate matching process for one or more first subframes based in part on the at least one active set of CSI-RS configurations indicated by the second signaling and based in part the CSI-RS configuration for the at least one other UE.

29. A method for wireless communication, comprising:
sending, by a base station, first signaling to configure a user equipment (UE) with a plurality of channel state information reference signal (CSI-RS) configurations, wherein the plurality of CSI-RS configurations comprise at least two sets of CSI-RS configurations, each set of the at least two sets of CSI-RS configurations including one or more respective CSI-RS configurations, wherein at least one of the sets comprises a CSI-RS configuration associated with an other UE served by the base station; and
sending, via a control channel, second signaling to indicate at least one active set of CSI-RS configurations for the UE, the at least one active set of CSI-RS configurations including a subset of the plurality of CSI-RS configurations, wherein the second signaling enables optimized de-rate matching by the UE using the at least one active set of CSI-RS configurations indicated by the second signaling.

30. The method of claim 29, wherein the sending first signaling comprises sending upper-layer signaling to configure the UE with the plurality of CSI-RS configurations, and wherein the sending second signaling comprises sending lower-layer signaling to indicate the at least one active set of CSI-RS configurations for the UE.

31. The method of claim 29, wherein the sending first signaling comprises sending Radio Resource Control (RRC) signaling to configure the UE with the plurality of CSI-RS configurations, and wherein the sending second signaling comprises sending control information on a physical channel or via Medium Access Control (MAC) to indicate the at least one active set of CSI-RS configurations for the UE.

32. The method of claim 29, wherein the at least two sets of CSI-RS configurations further comprise a first set of CSI-RS configurations that is always active for the UE and a second set of CSI-RS configurations that can be activated or deactivated for the UE, and wherein the sending the second signaling comprises sending the second signaling indicating at least one active CSI-RS configuration in the second set of CSI-RS configurations.

33. The method of claim 29, wherein the plurality of CSI-RS configurations comprise a CSI-RS configuration that is active for a first communication task and is inactive for a second communication task.

34. The method of claim 29, wherein the plurality of CSI-RS configurations comprise a CSI-RS configuration that can be activated or deactivated for a first communication task and is always active for a second communication task.

35. The method of claim 29, wherein the plurality of CSI-RS configurations comprise a first CSI-RS configuration that can be activated or deactivated for a first communication task and a second CSI-RS configuration that is always active for a second communication task.

36. The method of claim 29, wherein the plurality of CSI-RS configurations comprise a first set of CSI-RS configurations for a first cell and a second set of CSI-RS configurations for a second cell, and wherein the at least one active set of CSI-RS configurations for the UE comprises either the first or second set of CSI-RS configurations.

37. The method of claim 29, wherein the plurality of CSI-RS configurations comprise at least two sets of CSI-RS configurations, each set of CSI-RS configurations being associated with one or more communication tasks.

38. The method of claim 37, wherein the second signaling comprises a bitmap with at least two bits for the at least two sets of CSI-RS configurations, each bit of the bitmap indicating whether an associated set of CSI-RS configurations is active for the UE.

39. The method of claim 37, wherein at least one group of CSI-RS configurations is formed based on the at least two sets of CSI-RS configurations, each group of CSI-RS configurations including at least one set of CSI-RS configurations, and wherein the second signaling comprises a bitmap with at least one bit for the at least one group of CSI-RS configurations, each bit of the bitmap indicating whether an associated group of CSI-RS configurations is active for the UE.

40. The method of claim 29, wherein the sending second signaling comprises sending the second signaling via a broadcast channel to all UEs in a cell or a multicast channel to a group of UEs including the UE.

41. The method of claim 29, further comprising:
sending signaling indicating at least one CSI-RS configuration for at least one neighbor cell.

42. The method of claim 29, further comprising receiving CSI feedback determined by the UE based on the at least one active set of CSI-RS configurations for the UE.

43. The method of claim 29, further comprising performing rate matching for at least one physical channel based on the at least one active set of CSI-RS configurations for the UE.

44. The method of claim 29, further comprising:
performing rate matching for a first physical channel based on the at least one active set of CSI-RS configurations for the UE, and
performing rate matching for a second physical channel based on the plurality of CSI-RS configurations configured for the UE.

45. The method of claim 29, further comprising:
determining CSI-RS types of the plurality of CSI-RS configurations, and
wherein the UE performs the de-rate matching by considering CSI-RS configurations of a first CSI-RS type and without considering CSI-RS configurations of a second CSI-RS type.

46. An apparatus for wireless communication, comprising:
at least one processor configured to:
send, by a base station, first signaling to configure a user equipment (UE) with a plurality of channel state information reference signal (CSI-RS) configurations, wherein the plurality of CSI-RS configurations comprise at least two sets of CSI-RS configurations, each set of the at least two sets of CSI-RS configurations including one or more respective CSI-RS configurations, wherein at least one of the sets comprises a CSI-RS configuration associated with an other UE served by the base station;
send, via a control channel, second signaling to indicate at least one active set of CSI-RS configurations for a plurality of UEs in a cell, the at least one active set of CSI-RS configurations including a subset of the plurality of CSI-RS configurations, wherein the second signaling enables the plurality of UEs to perform optimized de-rate matching for one or more first subframes by using the at least one active set of CSI-RS configurations indicated in the second signaling; and
a memory coupled to the at least one processor.

47. The apparatus of claim 46, wherein the at least two sets of CSI-RS configurations further comprise a first set of CSI-RS configurations that is always active for the UE and a second set of CSI-RS configurations that can be activated or deactivated for the UE, and wherein the at least one processor is configured to send the second signaling indicating at least one active CSI-RS configuration in the second set of CSI-RS configurations.

48. The apparatus of claim 46, wherein the at least one processor is configured to receive CSI feedback determined by the UE based on the at least one active set of CSI-RS configurations for the UE.

49. The apparatus of claim 46, wherein the at least one processor is configured to perform rate matching for at least one physical channel based on the at least one active set of CSI-RS configurations for the UE.

50. An apparatus for wireless communication, comprising:
means for sending first signaling to configure a user equipment (UE) with a plurality of channel state information reference signal (CSI-RS) configurations, wherein the plurality of CSI-RS configurations comprise at least two sets of CSI-RS configurations, each set of the at least two sets of CSI-RS configurations including one or more respective CSI-RS configurations; and
means for sending, via a control channel, second signaling to indicate at least one active set of CSI-RS configurations for a plurality of UEs in a cell, the at least one active set of CSI-RS configurations including a subset of the plurality of CSI-RS configurations, wherein the second signaling is effective to allow the plurality of UEs to perform an optimized de-rate matching process for one or more first subframes based in part on the at least one active set of CSI-RS configurations indicated by the second signaling and based in part on the plurality of UEs accessing active sets of CSI-RS configurations for other UEs in the cell via the control channel, wherein the optimized de-rate matching process increases decoding performance for one or more physical channels of each of the plurality of UEs.

51. The apparatus of claim 50, wherein the at least two sets of CSI-RS configurations further comprise a first set of CSI-RS configurations that is always active for the UE and a second set of CSI-RS configurations that can be activated or deactivated for the UE, and wherein the means for sending the second signaling comprises means for sending the second signaling indicating at least one active CSI-RS configuration in the second set of CSI-RS configurations.

52. The apparatus of claim 50, further comprising means for receiving CSI feedback determined by the UE based on the at least one active set of CSI-RS configurations for the UE.

53. The apparatus of claim 50, further comprising means for performing rate matching for at least one physical channel based on the at least one active set of CSI-RS configurations for the UE.

54. A computer program product, comprising:
a non-transitory computer-readable medium comprising:
code for causing at least one processor to send first signaling to configure a user equipment (UE) with a plurality of channel state information reference signal (CSI-RS) configurations, wherein the plurality of CSI-RS configurations comprise at least two sets of CSI-RS configurations, each set of the at least two sets of CSI-RS configurations including one or more respective CSI-RS configurations; and
code for causing the at least one processor to send, via a multicast channel, second signaling to indicate at least one active set of CSI-RS configurations for a plurality of UEs in a cell, the at least one active set of CSI-RS configurations including a subset of the plurality of CSI-RS configurations, wherein the second signaling is effective to allow the plurality of UEs to perform de-rate matching for one or more first subframes based in part on the at least one active set of CSI-RS configurations indicated by the second signaling and based in part on the plurality of UEs accessing active sets of CSI-RS configurations for other UEs in the cell via a control channel.

55. The method of claim 1, further comprising:
receiving third signaling indicating at least one other active set of CSI-RS configurations for the UE, the at least one other active set of CSI-RS configurations including a different subset of the plurality of CSI-RS configurations from the at least one active set indicated by the second signaling; and
performing, by the UE, de-rate matching for one or more second subframes based in part on the at least one other active set of CSI-RS configurations indicated by the third signaling.

* * * * *